(12) United States Patent
Adams et al.

(10) Patent No.: US 6,794,000 B2
(45) Date of Patent: Sep. 21, 2004

(54) TAMPER EVIDENT LABEL WITH TRANSPONDER EMPLOYING MULTIPLE PROPAGATION POINTS

(75) Inventors: Matthew Thomas Adams, Mason, OH (US); Douglas Adrian Taylor, Monroe, OH (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 10/197,002

(22) Filed: Jul. 17, 2002

(65) Prior Publication Data

US 2003/0031819 A1 Feb. 13, 2003

(Under 37 CFR 1.47)

Related U.S. Application Data

(60) Provisional application No. 60/306,050, filed on Jul. 17, 2001, now abandoned.

(51) Int. Cl.[7] .............................................. G08B 13/14
(52) U.S. Cl. ................... 428/40.1; 340/572.1; 343/873; 428/40.9; 428/41.7; 428/41.8; 428/42.1; 428/201; 428/220
(58) Field of Search ............................ 428/40.1, 40.9, 428/41.7, 41.8, 42.1, 201, 220; 343/873; 340/572.1

(56) References Cited

U.S. PATENT DOCUMENTS 5,751,256 A * 5/1998 McDonough ................ 343/873
2002/0135481 A1 * 9/2002 Conwell .................. 340/572.1

* cited by examiner

Primary Examiner—Nasser Ahmad
(74) Attorney, Agent, or Firm—Orum & Roth

(57) ABSTRACT

A RFID label with tamper-evident capabilities that is useable with many surfaces. The RFID label has a release layer positioned between the transponder substrate and the printed ink antenna. The release layer uses a pattern of adhesive whereby different surface's cohesive strengths are accommodated. The adhesive pattern accommodates high and low substrate cohesive strength depending on which portion of the label is experiencing separation force. Because the release layer is in contact with the patterned adhesive, when the label is removed the antenna separates from the transponder substrate.

The patterned adhesive may be applied only to a localized area of the label to target a specific transponder feature.

The patterned adhesive may be also be combined with propagation slits in the label carrier film. The slits, when stressed, start propagating tears in the label surface ultimately severing the antenna, thereby destroying the transponder.

20 Claims, 3 Drawing Sheets

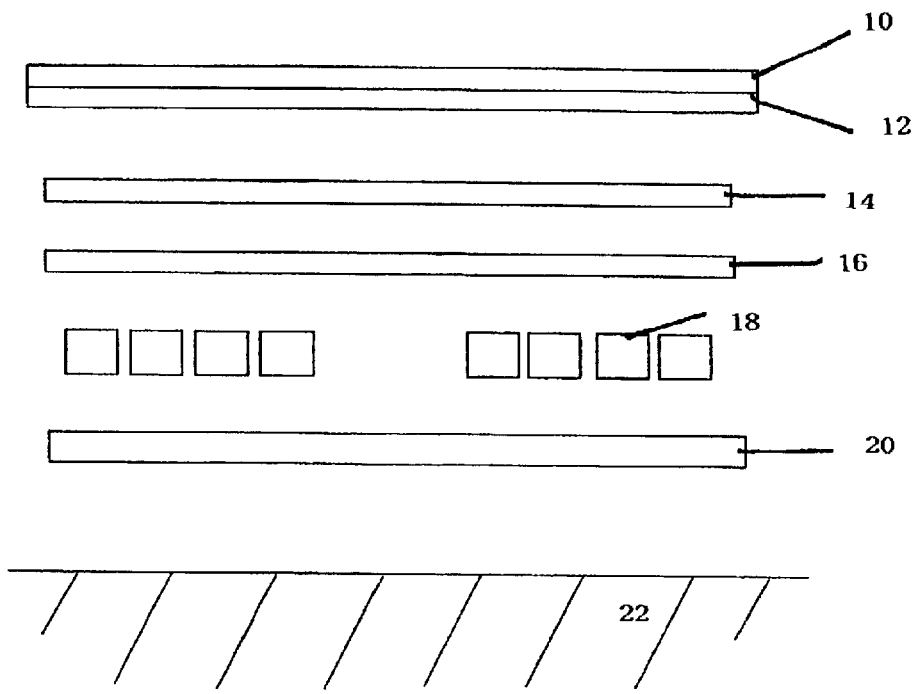
Figure 1
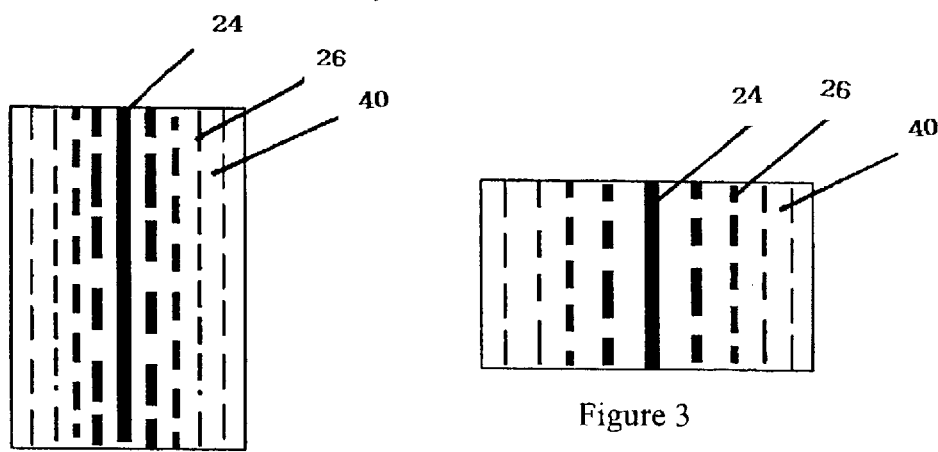
Figure 2
Figure 3

TAMPER EVIDENT LABEL WITH TRANSPONDER EMPLOYING MULTIPLE PROPAGATION POINTS

This application claims the benefit of provisional application 60/306,050 filed Jul. 17, 2001 now ABN.

FIELD OF THE INVENTION

The present invention generally relates to tamper evident labels. Specifically, the present invention relates to tamper evident labels incorporating RFID transponders. Multiple adhesive and/or slitted media propagation points are used to ensure that a label with a transponder may not be removed without destroying the transponder operability.

DESCRIPTION OF RELATED ART

RFID transponders are well known in the art. RFID transponders may be integrated into a label which is then used to affix the RFID transponder functionally to a desired surface, object and or package. RFID transponders integrated into labels are generally designed to be thinner overall and durable enough to withstand an automated insertion process during label manufacture.

However, the high durability of the transponder integrated into the label also allows the transponder to be removed from one object and then, if desired, repositioned onto another object without damaging the transponder. This characteristic should be avoided where the RFID transponder is used, for example, as an anti-counterfeiting device. It is also desirable in many other applications to have an RFID label that is tamper evident, for example, in security applications.

Previous tamper evident RFID labels have been designed and developed using a release layer between the transponder substrate and the printed ink antenna. When the RFID is attached to the substrate a bond is formed which during an attempted removal of the transponder is higher than that of a bond between the transponder carrier film and the printed antenna. Therefore, if the transponder is removed, the antenna will tear/disconnect thereby self-destructing and leaving the RFID inoperative.

A manufacturer using the previous form of tamper-evident RFID labels is required to tune the release layer force and the adhesive for each surface corresponding to different objects/materials which the label will be affixed to.

The release layer in previous tamper-evident transponders must be fine tuned to allow a correct release force between the antenna and a pre-identified substrate. If the adhesive release force is too light, the antenna may not successfully propagate a disabling tear. If the adhesive release force is too high, the label may separate at the substrate level, for example tearing a corrugated box rather than the label. Where the label is removable intact from the package the tamper-evident properties of a label are nullified. Also, the RFID label may be reaffixed, perhaps to a different object, thereby frustrating security and anti-counterfeiting uses. Further, the adhesive typically is selected for a specific footprint size and substrate material. As the footprint size increases, the bond strength increases.

The drawback with this method is that it requires a wide range of different configurations, increasing cost and reducing usability of the RFID label. Therefore, it is an object of the present invention to provide a tamper-evident label which may be used on a wide range of substrates/materials/objects without requiring reconfiguration of the release layer release force or changing the adhesive.

SUMMARY OF THE INVENTION

A RFID label with tamper-evident anti-counterfeiting and security capabilities, that in a single configuration is usable with many substrates. The release layer is positioned between the transponder substrate and the printed ink antenna. The RFID label release layer uses a pattern of adhesive whereby different substrate's cohesive strengths are accommodated. The adhesive pattern accommodates high and low substrate cohesive strength depending on which portion of the label is experiencing separation force. Because the release layer is in contact with the patterned adhesive, when the label is removed the antenna separates from the transponder substrate.

The patterned adhesive may also be combined with propagation slits in the label carrier film. The slits, when stressed, start propagating tears in the label surface ultimately severing the antenna, thereby destroying the transponder.

BRIEF DESCRIPTION OF THE DRAWINGS

FIG. 1 is a schematic side view of a label according to the present invention identifying the different layers that may be present.

FIG. 2 is a schematic of a label according to the present invention showing one embodiment of the release layer adhesive pattern.

FIG. 3 is a schematic of a label according to the present invention showing another embodiment of the release layer adhesive pattern.

DETAILED DESCRIPTION

Figure 4:
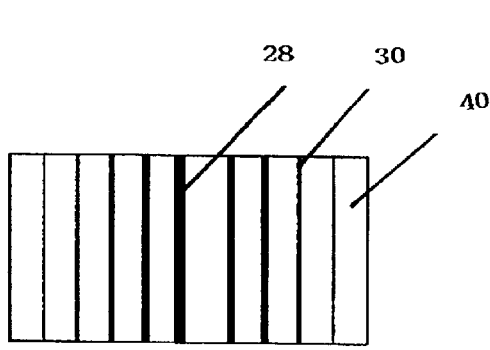
FIG. 4 is a schematic of a label according to the present invention showing another embodiment of the release layer adhesive pattern.

Referring to FIG. 1, a label in expanded cross-sectional view is shown. The label comprises a plurality of layers. The first layer is a label face sheet 10 with a top surface which is exposed and an underside opposite the top surface onto which a label adhesive 12 is applied. The label adhesive 12 adheres the face sheet 10 to the transponder carrier film 14. Preferably the top surface of transponder carrier film 14 is made out of polyester. Most preferably, the transponder carrier film 14 is made out of PET. The underside of the transponder carrier film is coated with a transponder release agent 16. Beneath the transponder release agent 16 is a printed antenna 18, preferably a printed ink antenna. The printed antenna 18 is sandwiched between the transponder release agent 16 and a pattern adhesive 20. The label is then able to be attached to a target surface 22.

The bond strength of the transponder to the target surface 22 is a function of the adhesive form relation, adhesive pattern, and the adhesive caliper. Adhesive may be, for example, hot melt, emulsion base, heat seal, thermo-set, and or others. As the footprint size increases the bond strength increases and the surface area of the transponder held to the target surface 22 increases. By providing a patterned adhesive 20 having an adhesive pattern with varying areas of adhesive footprint a range of adhesive strengths is created. Each different sized footprint having a larger or smaller adhesive bond strength corresponding to its relative footprint size.

When the release agent 16 is combined with a patterned adhesive layer 20, sandwiching the printed antenna 18, a range of bond strengths allows for transfer to occur both at the patterned adhesive 20 and at the release agent 16. The release layer 16 is compromised thereby separating the printed antenna 18 from the transponder carrier film 14 and a separation occurs when the bond strength of the patterned adhesive 20 exceeds that of the release agent 16. When the footprint of the patterned adhesive 20 increases to a point where the bond strength of the particular release agent 16 encountered finally exceeds that of the patterned adhesive 20, separation occurs at the pattern adhesive 20, rather than at the release agent 16.

For small footprints, the bond between the patterned adhesive 20 and target surface 22 is less than between the antenna 18 and the release agent 16. As the footprint increases, there will be a point where this relationship reverses, i.e. the bond between the target surface 22 and the patterned adhesive 20 exceeds the bond strength between the release agent 16 and the transponder carrier film 14 or the antenna 18. When the switch occurs, the printed antenna 18 becomes separated or severed from the transponder carrier film 14 thereby destroying the RFID function of the label while at the same time visually indicating that tampering has occurred.

Where the target surface 22 has a high cohesive strength, for example HDPE, a small footprint pattern may be used without an elaborate adhesive distribution pattern. When (a) the cohesive strength of the target surface 22 is greater than the bond strength between the patterned adhesive 20 and the target surface 22; (b) the bond strength between the patterned adhesive 20 and the transponder carrier film 14 is greater than the bond strength between the antenna 18 and the release agent 16; and (c) the bond strength between the antenna 18 and the release agent 16 is greater than the bond strength between the release layer 16 and the transponder carrier film 14, the label may not be removed without separation occurring at the release agent layer 16 thereby destroying RFID functionality as the antenna is severed from the transponder chip.

In terms of the adhesive bond strength, the separation of the antenna 18 from the transponder chip (not shown) will occur when the bond strength between the patterned adhesive 20 and the target surface 22 exceeds the bond strength between the release agent 16 and the transponder carrier film 14. Applying the adhesive 20 in patterns as shown in FIGS. 2–12 provides a multiplicity of adhesive areas of varying strength.

At some point, depending upon the adhesive qualities of the target surface 22, the adhesive strength of the individual patterned adhesive 20 then under tension will exceed that of the release layer 16 and therefore initiate a split between the transponder carrier film 14 and the printed antenna 18. By increasing the number of different adhesive bands, the potential for transferring the antenna 18 to the target surface 22 and severing it from the transponder chip (not shown) increases.

As the weight of the individual adhesives is increased, the bond strength typically also increases. Once the adhesive pattern is formed, the adhesive coat weight may be adjusted to a construction performing over a wide range of target substrates. Each division of the adhesive across the adhesive pattern creates a separate opportunity for the relative strengths of the adhesive layers to be tested. Each division having a varying release layer strength until one where the patterned adhesive layer 20 is less than that of the release agent 16 is encountered.

Referring to FIGS. 2–11, various patterns for adhesive are shown. Referring to FIGS. 2–7, from the edges inward the adhesive strength increases. Turning to FIGS. 2–3, labels 40 are shown. The bottom surface of the label 40 is shown with an exposed adhesive pattern 24, 26. The pattern comprises a heavy solid stripe 24 of adhesive applied along the center line of the label 40. On either side of the solid stripe 24 of the adhesive is a plurality of shorter stripes 26 of adhesive of decreasing adhesive footprint as the stripes 26 are applied closer to the label 40 edges.

Figure 5:
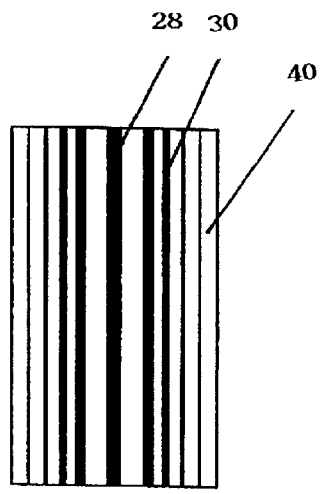
FIG. 5 is a schematic of a label according to the present invention showing another embodiment of the release layer adhesive pattern.
Figure 6:
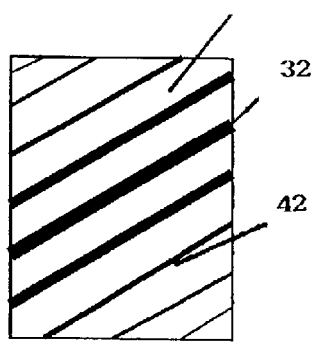
FIG. 6 is a schematic of a label according to the present invention showing another embodiment of the release layer adhesive pattern.

Turning now to FIGS. 4–6, labels 40 with a plurality of adhesive stripes are shown. FIGS. 4 and 5 show labels with a heavy solid heavy stripe 28 of adhesive applied along the centerline of the labels 40. On either side of the heavy solid stripe 28 of adhesive is a series of adhesive stripes 30 of decreasing width as the stripes are applied closer to the edge of the labels 40. FIG. 6 shows a label with a plurality of diagonal adhesive stripes. A heavy solid adhesive stripe 32 is applied across a substantially diagonally centerline of the label 40. On either side of the heavy solid stripe 32 is a series of stripes 42 of decreasing length and width as the stripes 42 are applied closer to opposing corners of the label 40.

Figure 7:
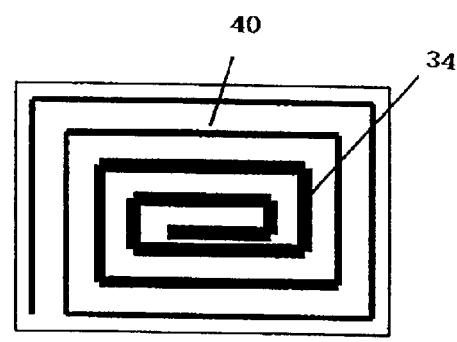
FIG. 7 is a schematic of a label according to the present invention showing another embodiment of the release layer adhesive pattern.
Figures 10, 11:
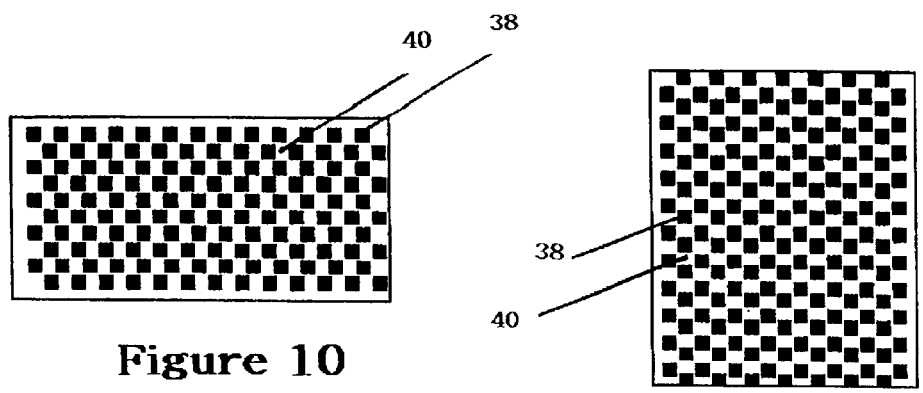
FIG. 10 is a schematic of a label according to the present invention showing another embodiment of the release layer adhesive pattern.
FIG. 11 is a schematic of a label according to the present invention showing another embodiment of the release layer adhesive pattern.

FIG. 7 shows a label 16 with a spiral 36 of adhesive. The adhesive footprint of spiral 36 is greatest in the center of the label 40. The adhesive footprint of the spiral 36 narrows at the adhesive spirals out towards the edges of the label 40. FIGS. 10 and 11 show labels 40 are shown where the adhesive is applied in a checkerboard pattern 38.

Figure 8:
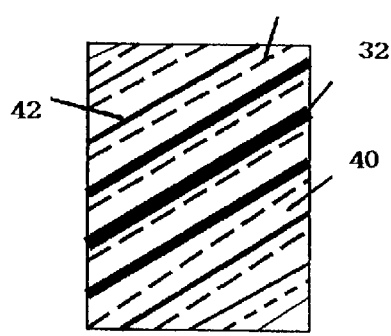
FIG. 8 is a schematic of a label according to the present invention showing the embodiment of the release layer adhesive pattern of FIG. 6 with propagation slits through the label layers.
Figure 9:
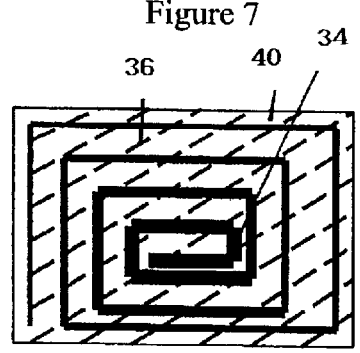
FIG. 9 is a schematic of a label according to the present invention showing the embodiment of the release layer adhesive pattern of FIG. 7 with propagation slits through the label layers.

Turning to FIGS. 8 and 9, labels 40 are shown with adhesive patterns and propagation slits 36. FIG. 8 shows a label with a series of adhesive stripes 32, 42 of decreasing width and length as the adhesive is applied from a substantially diagonal center line outward toward opposing corners. The center stripe 32 which transverses the label across a substantially diagonal centerline is the longest and heaviest stripe. Additionally, the label is scored with a serious of propagation slits 36 which when stressed will create tears in the transponder carrier film (not shown). The tears allow someone to determine that the label has been tampered with. The slits 36 are also capable of severing the antenna (not shown) resulting in the destruction of the transponder. These slits 36 may be made in the transponder carrier film before its applied to the label or in the finished label 40. FIG. 8 shows a label with a spiral 34 adhesive of increasing adhesive footprint as the adhesive spirals towards the center of label 40 with a series of propagation slits 36 in the label 40.

In another embodiment, the adhesive patterns is localized to target a single feature of the transponder. For example, the adhesive may be applied only to the area where a specific portion of the transponder exists, such as the crossover portion of the antenna, the Application Specific Integrated Circuit (ASIC), the portion of the antenna connected to the ASIC, etc. By focusing the adhesive upon a critical portion of the transponder, the total amount of adhesive may be reduced. Additionally by applying a very local destructive adhesive to the label, the label may be deactivated without obvious visible signs on the label itself.

What is claimed is:

1. A tamper evident label RFID, comprising:
   a layered construction of
   a label face sheet,
   a transponder carrier film positioned beneath the face sheet,
   a transponder with an antenna,
   a release agent positioned beneath the transponder carrier film, and
   a patterned adhesive having an adhesive pattern, said adhesive pattern comprising areas of adhesive and areas free of adhesive and said areas of adhesive have varying adhesive strengths,
   wherein said antenna is sandwiched between the release agent and the patterned adhesive and said label is attached to an object.

2. The RFID label of claim 1 wherein said adhesive pattern is a spiral and said spiral has an adhesive strength that increases toward the center of the spiral.

3. The RFID label of claim 1 wherein said adhesive pattern is a plurality of adhesive stripes and the adhesive footprint of at least a first adhesive stripe is different from the adhesive footprint of at least a second adhesive stripe.

4. The RFID label of claim 3 wherein the adhesive footprint of the stripes increases from the edges of the label to a substantially center line of the label.

5. The RFID label of claim 3 wherein the adhesive footprint of the stripes decreases from a substantially center line to the edges of the label.

6. The RFID label of claim 3 wherein the adhesive footprint is varied by varying the length of the adhesive stripes.

7. The RFID label of claim 3 wherein the adhesive footprint is varied by varying the width of the adhesive stripes.

8. The RFID label of claim 1 wherein the patterned adhesive is localized to a feature of said transponder.

9. The RFID label of claim 8 wherein the patterned adhesive is localized to a cross-over portion of the antenna.

10. The RFID label of claim 8 wherein the patterned adhesive is localized portion of the antenna connected to an integrated circuit.

11. The RFID label of claim 1 further comprising a plurality of propagation slits.

12. The RFID label of claim 11 wherein said propagation slits are in said carrier film.

13. The RFID label of claim 11 wherein said propagation slits are in said face sheet.

14. The RFID label of claim 2 further comprising a plurality of propagation slits.

15. The RFID label of claim 14 wherein said propagation slits are in said carrier film.

16. The RFID label of claim 14 wherein said propagation slits are in said face sheet.

17. The RFID label of claim 3 further comprising a plurality of propagation slits.

18. The RFID label of claim 17 wherein said propagation slits are in said carrier film.

19. The RFID label of claim 7 wherein said propagation slits are in said face sheet.

20. A tamper evident label RFID, comprising:
    a layered construction of
    a label face sheet,
    a transponder carrier film positioned beneath the face sheet,
    a transponder with an antenna,
    a release agent positioned beneath the transponder carrier film,
    a patterned adhesive having an adhesive pattern, and
    a plurality of propagation slits
    wherein said antenna is sandwiched between the release agent and the patterned adhesive.

* * * * *